(12) United States Patent
Green et al.

(10) Patent No.: US 10,771,526 B2
(45) Date of Patent: *Sep. 8, 2020

(54) METHOD FOR DELIVERING MUSIC CONTENT TO A SMART PHONE

(71) Applicant: 1974 Productions Inc., Dallas, TX (US)

(72) Inventors: William Green, Keller, TX (US); James L. Cross, Allen, TX (US)

(73) Assignee: 1974 Productions, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,489

(22) Filed: Nov. 27, 2018

(65) Prior Publication Data

US 2019/0098063 A1    Mar. 28, 2019

Related U.S. Application Data

(63) Continuation of application No. 15/141,146, filed on Apr. 28, 2016, now Pat. No. 10,142,383, which is a
(Continued)

(51) Int. Cl.
*H04L 29/06* (2006.01)
*G06Q 20/34* (2012.01)
(Continued)

(52) U.S. Cl.
CPC ............ *H04L 65/60* (2013.01); *G06F 16/955* (2019.01); *G06Q 20/123* (2013.01);
(Continued)

(58) Field of Classification Search
CPC ................ G06F 16/955; G06Q 20/123; G06Q 20/1235; G06Q 20/32; G06Q 20/3276;
(Continued)

(56) References Cited

U.S. PATENT DOCUMENTS 8,971,791 B2 * 3/2015 Green .................... H04H 20/72
340/540
9,477,954 B2 * 10/2016 Green .................... H04H 20/72
(Continued)

*Primary Examiner* — Tan H Trinh
(74) *Attorney, Agent, or Firm* — Gregory M. Howison

(57) ABSTRACT

A method of distributing media content using mobile communication devices including providing media access cards which promote selected media content to users of such devices whereby a user may access a web server associated with the media access cards and download application software enabling access to selected media content via a mobile device, the media access cards including a machine readable identification number code that identifies media content associated with the card whereby the application software facilitates reading and transmitting the code to a web server via the mobile device, receiving the identification number with the web server and using the identification number to locate a table value in a database wherein a plurality of media access cards identification numbers are associated with a media content table value, using the table value to identify media codes associated with the selected content server which transmits media to the mobile device.

13 Claims, 10 Drawing Sheets

Related U.S. Application Data continuation-in-part of application No. 14/635,968, filed on Mar. 2, 2015, now Pat. No. 9,477,954, which is a continuation of application No. 13/767,605, filed on Feb. 14, 2013, now Pat. No. 8,971,791.

(60) Provisional application No. 61/599,517, filed on Feb. 16, 2012.

(51) Int. Cl.
*G06Q 20/12* (2012.01)
*G06Q 20/32* (2012.01)
*G06Q 30/02* (2012.01)
*G06F 16/955* (2019.01)

(52) U.S. Cl.
CPC ......... *G06Q 20/1235* (2013.01); *G06Q 20/32* (2013.01); *G06Q 20/3276* (2013.01); *G06Q 20/342* (2013.01); *G06Q 30/0207* (2013.01); *G06Q 30/0225* (2013.01); *G06Q 30/0267* (2013.01)

(58) Field of Classification Search
CPC ............. G06Q 20/342; G06Q 30/0207; G06Q 30/0225; G06Q 30/0267; H04L 65/60
USPC ....... 455/3.01, 3.06, 3.05, 41.2, 41.3, 414.1, 455/552.1, 422.1; 370/338; 340/540; 707/101.3, 104.1, 10
See application file for complete search history.

(56) References Cited

U.S. PATENT DOCUMENTS

| | | | |
|---|---|---|---|
| 10,142,383 B2 * | 11/2018 | Green | G06F 16/955 |
| 2009/0117846 A1 * | 5/2009 | Mavrakakis | H04N 7/16 |
| | | | 455/3.06 |
| 2009/0132813 A1 * | 5/2009 | Schibuk | G06Q 20/223 |
| | | | 713/158 |
| 2010/0057563 A1 * | 3/2010 | Rauber | G06Q 30/02 |
| | | | 705/14.53 |
| 2010/0057924 A1 * | 3/2010 | Rauber | G06Q 30/00 |
| | | | 709/229 |
| 2011/0041157 A1 * | 2/2011 | Dasher | H04N 7/163 |
| | | | 725/98 |
| 2013/0311278 A1 * | 11/2013 | Christensen | G11C 7/1066 |
| | | | 705/14.49 |

* cited by examiner

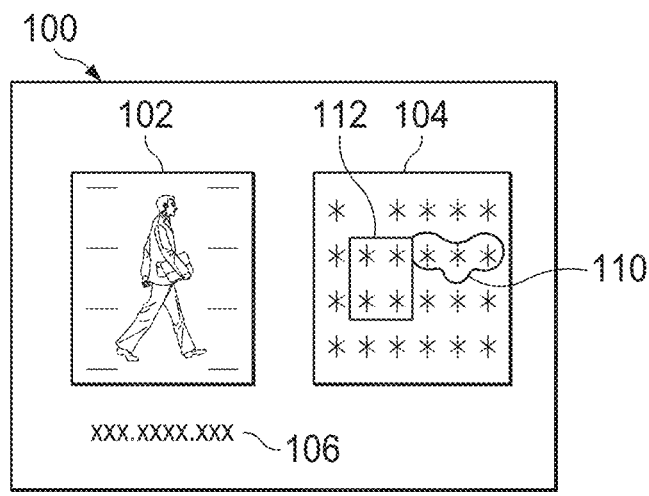
FIG. 1
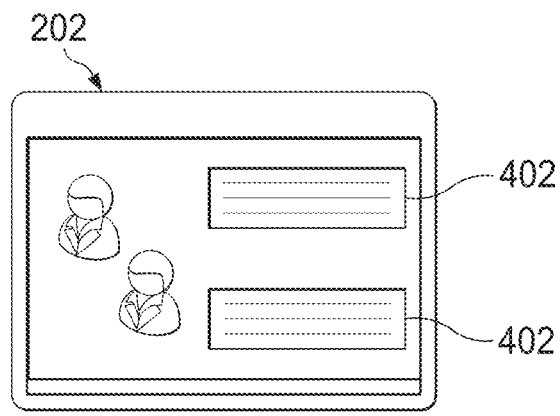
FIG. 4
| | LOCATION | URL | ADVERTISING CODE |
|---|---|---|---|
| | 1A | xx.xx.xx | UNREGISTERED |
| | | | REGISTERED STANDARD |
| | | | REGISTERED FAMILY |
| | | | REGISTERED ADULT |
| | 2F | xx.xx.xx | OTHER |
FIG. 5

METHOD FOR DELIVERING MUSIC CONTENT TO A SMART PHONE

CROSS-REFERENCE TO RELATED APPLICATIONS

This application is a continuation of U.S. patent application Ser. No. 15/141,146, filed Apr. 28, 2016, entitled METHOD FOR DELIVERING MUSIC CONTENT TO A SMART PHONE, now U.S. Pat. No. 10,142,383, issued on Nov. 27, 2018, which is a continuation-in-part of U.S. patent application Ser. No. 14/635,968, filed Mar. 2, 2015, entitled METHOD FOR DELIVERING MUSIC CONTENT TO A SMART PHONE, now U.S. Pat. No. 9,477,954 on Oct. 25, 2016, which is a continuation of U.S. patent application Ser. No. 13/767,605, filed on Feb. 14, 2013, entitled METHOD FOR DELIVERING MUSIC CONTENT TO A SMART PHONE, now U.S. Pat. No. 8,971,791, issued Mar. 3, 2015, which claims benefit of U.S. Provisional Application No. 61/599,517, filed Feb. 16, 2012, entitled METHOD FOR DELIVERING MUSIC CONTENT TO A SMART PHONE, the specifications of which are incorporated herein in their entirety.

TECHNICAL FIELD

The following disclosure relates to a method and system for providing a user of a mobile communications device with selected media content.

BACKGROUND

Trading cards, such as baseball cards, have been popular for generations. Traditionally, trading cards have been used to identify sports figures; baseball cards are especially well-known. Other such cards have often featured cartoons, comic book characters, TV characters and similar well known characters or similar subject matter. As such, trading cards present a potential means for performing artists, typically musicians, to promote their works.

Smart phones, e.g., mobile communications devices built on a mobile operating system, have become ubiquitous. Such devices include computing capability and connectivity, many with high-resolution touch screens and web browsers. Smart phones utilize Wi-Fi and broadband carriers for high speed data access and transmission. Recently, the rapid development of mobile applications, application programs for smart phones and advanced application programming interfaces for running third party applications have driven the adoption and use of smart phones. Such mobile communication devices, used with a form of trading cards, are the subject of the present disclosure.

SUMMARY

A method of distributing media content using mobile communication devices includes providing media access cards to users of the mobile communication devices. The cards may be sold, distributed as promotional items or otherwise distributed. The cards promote selected media content such that a user may access a website associate with the media access cards with the user's mobile communication device and download application software enabling the user to access the selected media content. The card includes machine-readable code corresponding to an identification number identifying media content associated with the card. The application software facilitates reading the machine readable code with the mobile user device and transmitting the code to a web server with the mobile user device. The web server uses the identification number to locate a table value in a database wherein identification numbers from a plurality of media access cards are each associated with a table value corresponding to media content associated with the access cards. The table value is then used to identify a media code associated with the selected media content in a content server. The media code may then be sent to the mobile communications device which may then transmit the media code to the content server. After receiving the media code, content server transmits the selected media content to the mobile communication device.

BRIEF DESCRIPTION OF THE DRAWINGS

For a more complete understanding, reference is now made to the following description taken in conjunction with the accompanying Drawings in which:

FIG. 1 is a representation of a promotional card used in connection with a method of providing users media content as disclosed herein;

FIG. 4 illustrates a display of a mobile user device wherein advertising content is presented to the user of the device;

FIG. 5 represents a database for use in selecting user appropriate advertising to be presented to the user of a mobile user device.

DETAILED DESCRIPTION

Figure 2:
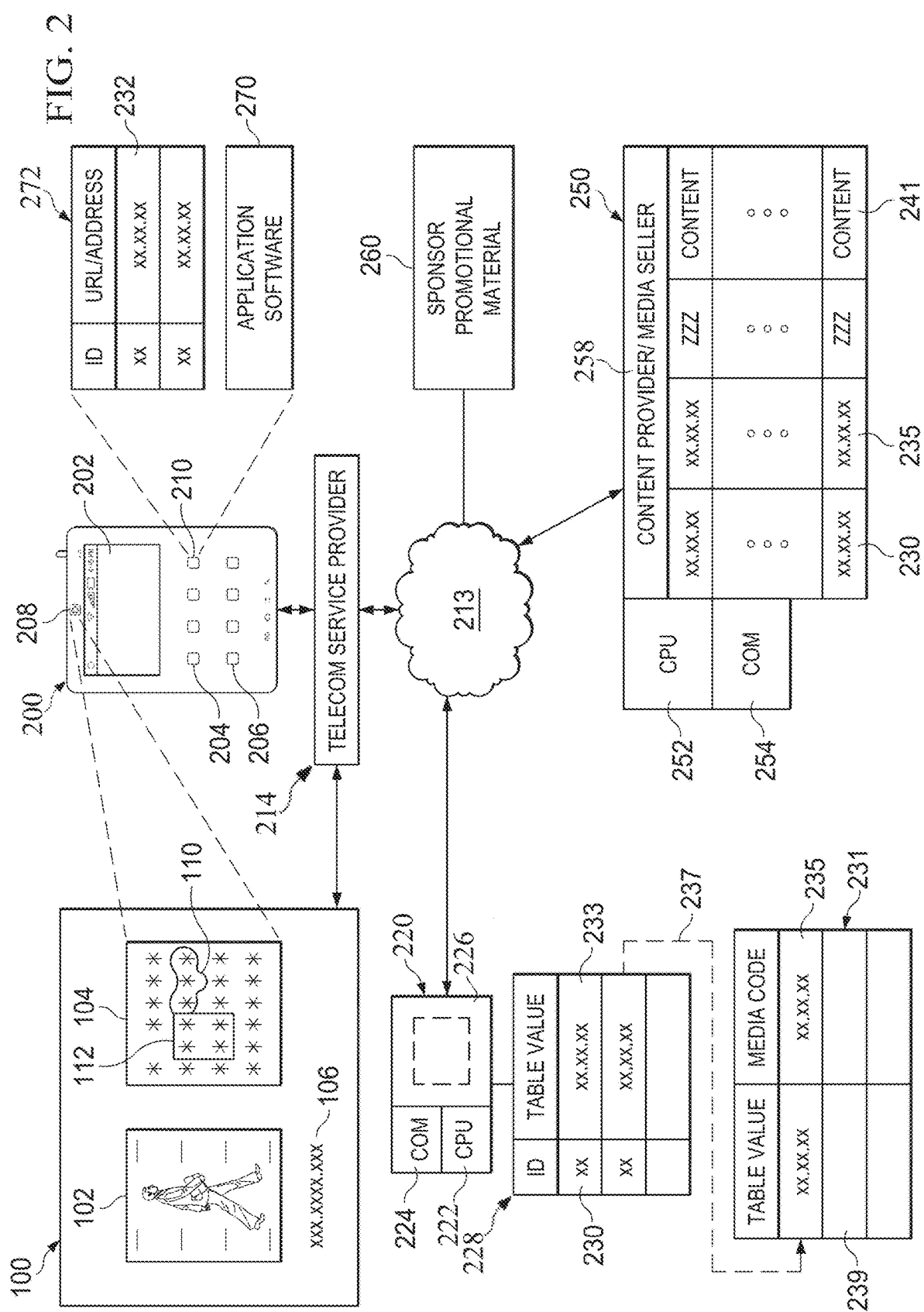
FIG. 2 is a schematic of a system for providing media content to users according to the disclosure.

Referring now to the drawings, wherein like reference numbers are used herein to designate like elements throughout, the various views and embodiments of a method for delivering music content to a smart phone are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a media access card for use in connection with a method of distributing music, music videos, electronic games or similar media content. Access cards 100 may be similar in size and appearance to the well-known baseball cards. As illustrated, each promotional or access card 100 may include an illustration or photograph 102 of a recording artist or another image associated with the particular media content being promoted. Card 100 also includes a machine readable code 104 associated with the song, video or other piece of media content being promoted. In one embodiment, machine readable code 104 may be a barcode, a QR code, an alphanumeric code or similar code. Code 104 is associated with the particular media content being promoted with card 100.

In one embodiment, a URL 106 is printed or reproduced on card 100 to enable a user to access a webpage to download application software enabling the user to access the media content being promoted. URL 106 may be in the form of a machine readable code such as a barcode or QR code such that the URL may be scanned. Cards 100 may be distributed in packages for sale at retail, or included as a promotion, for example, in cereal boxes or with other goods or services typically purchased by consumers. If distributed in packages, cards 100 may be grouped by an artist, a particular type of music or video or on the basis of other content-related criteria. In some variations, a consumer may be charged a fee for cards 100.

The machine readable code 104 of cards 100, for example, a QR code, may include an image or indicia 110 positioned within or embedded in the code. The image may be used in connection with a program e.g., the application software, which identifies image 110 and/or a portion 112 of the QR code within code 104. As set forth in greater detail below, image 110 may serve as a means of further identifying a recording artist, a provider of media content, and/or specific media content that may be accessed using the card. As will be appreciated, image or indicia 110 serves as a pointer or locator for portion 112 of code 104 and may be positioned at different locations on card 100.

FIG. 2 is a schematic including a system for providing media content to users of a mobile user device 200. Wireless user device 200 may be a cell phone, a PDA, a tablet or similar device. User device 200 is configured with the software and hardware required to access a public network such as the Internet such that the device may be utilized to access the media content promoted with promotional card 100. User device 200 will typically include a display 202, a processor 204, a GPS locator chip or chipset 206 and a camera 208. User device 200 also includes a storage device 210 for data storage and retrieval. User device 200 will have an electronic serial number (ESN) and/or a mobile identification number (MIN) associated therewith such that the user device may be identified. User device 200 is configured to access a network such as the Internet 213 via a telecom service provider 214. A user may thereby access a first web server 220 by entering or scanning the URL 106 from card 100 using device 200. As set forth in detail below, an application program or software 270, associated with cards 100, along with one or more databases 272 may be stored on user device 200.

Web server 220 includes a processor 222 and a communications interface 224 that enables the server to communicate with user device 200 via the Internet 213 and telecom service provider 214. First web server 220 also includes a data storage device 226 for storing one or more relational databases or look-up tables 228. Database 228 includes a plurality of unique identifiers or IDs 230, each encoded as all or a portion 112 of code 104 on promotional card 100 promoting particular media content. As set forth in detail below, identifiers 230 enable mobile user device 200 to access content providers 250.

A database of user information may be stored on web server 220. The database may include user profiles including names, addresses, birthdates, media content preferences, marital status and similar information that may be useful for marketing and demographic purposes. The ESN or MIN of the user's device 200 may be linked in the database to the profile of the user for identification purposes. A user profile may also include credit or debit card information to enable a user to pay for selected media content. The database or another database resident on, or in communication with server 220 may also include a plurality of "tokens" or identifiers, each associated with individual copies of the application software downloaded to mobile user devices 200.

Each content provider 250 includes a processor 252, a communications interface 254 and a data storage device. A database 258 stored on the data storage device includes a plurality of different pieces of media content 241 such as songs and/or video clips. Sponsor information may be associated with different pieces of media content, such that sponsor promotional material may appear along with the sponsored media content when played or displayed with user device 200. In this regard, web server 220 and/or content provider server 250 may communicate with one or more sponsor or advertising entity servers 260 in order to associate promotional materials with different pieces of media content.

Figure 3:
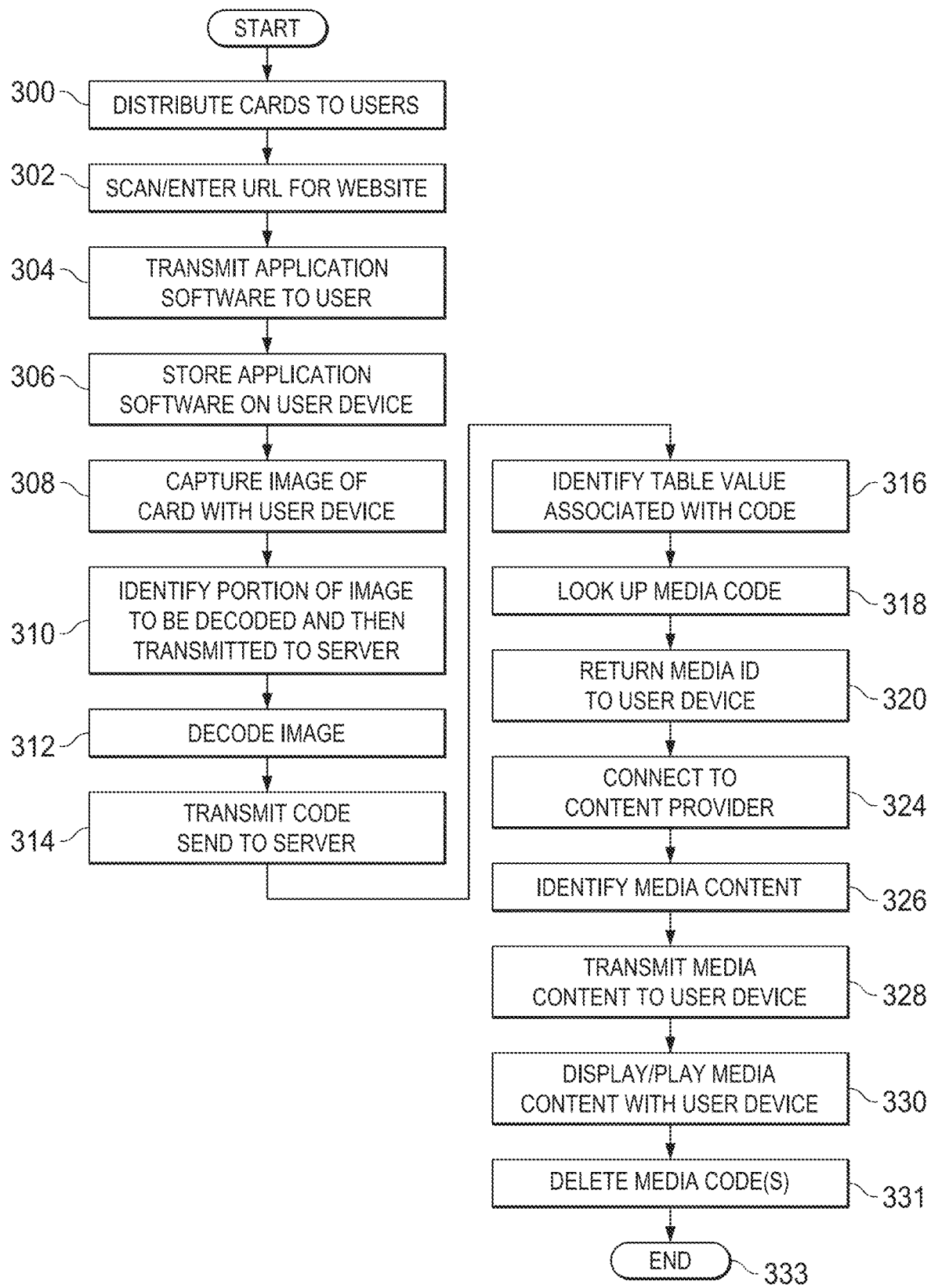
FIG. 3 is a flowchart illustrating a method of providing media content to users having mobile user devices as disclosed herein.

FIG. 3 is a flowchart illustrating a method of providing media content such as songs and videos to a user having a mobile user device 200. The process begins at step 300 where cards 100 are distributed to users. At step 302, a user enters or scans the URL for server 220 and is provided with application software 270 at step 304 that enables the user to access selected media content. Application software 270 may be compatible with one or more operating systems used by different mobile devices 200. The application software 270 may be adapted to function with mobile devices 200 having different operating systems. As previously noted, a user may input or scan URL 106 on card 100 to access web server 220 to download application software 270.

After the user has downloaded application software 270, the software is stored on device 200 at step 306 and the user may then use card 100 to access selected media content as set forth below. In one embodiment, a token or authentication code may be downloaded with the application software. The token or authentication code may be unique for each download of the application software. The user may be charged a fee for the application software or the application software may be provided to the user free of charge. A database 272 may be downloaded to device 200 with the application software.

After the user has downloaded the application software to device 200 and acquired promotional card 100, he or she may capture an image of card code 104 at step 308 from the card using camera 208 of the user device. In different variations, code 104 may be a QR code, a barcode, an alphanumeric code or a similar code. Code 104 may incorporate an image 110 that further serves to facilitate identification of relevant parts of code 104. The application software may include instructions for identifying image 110 and differentiating the image and/or a portion 112 of machine readable code 104 from the remainder of the code. One or more features of image 110 may be used for identifying relevant portions of code 104. For example, in one embodiment, lines or similar features of image 110 may be used by the application software to identify certain portions 112 of code 104 that contain the ID code 230 associated with particular media content.

As illustrated, portion 112 is embedded in a larger field 104 of machine readable code along with image or indicia 110. Image 110 is recognized by application software 270 as a pointer or locator that identifies the portion 112 of code 104 corresponding to ID 230. The portion 112 of code 104 containing ID 230 may then be read and decoded with application software 270 and transmitted to web server 220 along with the token or authentication code associated with the application software resident on user device 200. Alternatively, if code 104 or portion 112 of code 104 is not decoded by the application software, an image of code 104 or portion 112 may be transmitted to server 220, for example as an image file.

In the case where the application software has not been loaded onto or programmed into mobile user device 200 and machine readable code 104 is scanned and decoded with another program or device, machine readable code 104 may be decoded as a URL for a website promoting cards 100 or another product or service. Similarly, if image 110 is not recognized with the application software when card 100 is scanned, machine readable code may be a URL for a website promoting cards 100 or another product or service. Alternatively, the application software may simply direct mobile user device 200 to display a "code not recognized" or "error" message to the user.

At step 310, the portion 112 of card code 104 including ID 230 is identified and then decoded with application software 270 at step 312. At step 314 ID code 230 is transmitted along with the token associated the application software from mobile user device 200 to server 220 via telecom service provider 214. Database 228 is then queried at step 316 to determine a table value 233. Table value 233 may be in the form of a pointer or IP address that identifies one or more media codes 235 associated with card 100 as indicated by arrow 237. Media codes 235 may be included in database 228 or in a separate database 231 on the same or a separate server 239. Media codes 235 serve to media content 241 stored on media server 250.

After media code 235 has been determined at step 318, the media code is then transmitted back to mobile user device 200 at step 320. A code or address pointing to sponsor promotional material resident on the same or a different server 260 may also be transmitted with media code 235 to user device 200. Mobile device 200 may query a database 272 to determine an IP address or URL 232 of a content provider 250 associated with media code 235 if the address of the media server is not been transmitted with the media code. Database 272 may be resident on mobile device 200, stored on server 220, or stored on a second server.

Address 232 identifies a content provider 250 that may be accessed to provide the selected media content. After the user device 200 is connected to content provider 250 at step 324, at step 326 the selected media content is identified using media code 235 and transmitted to mobile user device 200 at step 328. The media content may be a music video, song, portion of a song, a video clip (trailer) for a movie or similar presentation or a portion or introduction to a video game. In one embodiment, the entire media content, i.e., a song, music video, video clip etc. is transmitted to user device. In another embodiment, a portion of the media content may be transmitted and presented to the user in a manner so as to enable the user to determine if he or she wishes to purchases the entire media content, for example a song or songs, a movie or an electronic game. In different variations, mobile device 200 also transmits a message to server 220 indicating that the selected media content has been transmitted to the device. Sponsor promotional material may be simultaneously transmitted to mobile device 200 from server 220 or server 250, depending upon where the sponsor promotional material is stored.

At step 330, the selected media content, along with sponsor promotional material, is played and/or displayed on mobile user device 200. In different variations, the selected media content transmitted to mobile user device 200 may be a music video, movie trailer (e.g., video clip), a song or portion of a song, a segment of an electronic game or similar content. FIG. 4 illustrates a display 202 of a mobile user device wherein media content and/or advertising content is presented to the user of mobile user device 200. As a security measure, media code or codes 235 are deleted from mobile user device 200 at step 331 after transmission of the selected media content or when application software 270 is closed on the device and the process ends at step 333.

Figure 3A:
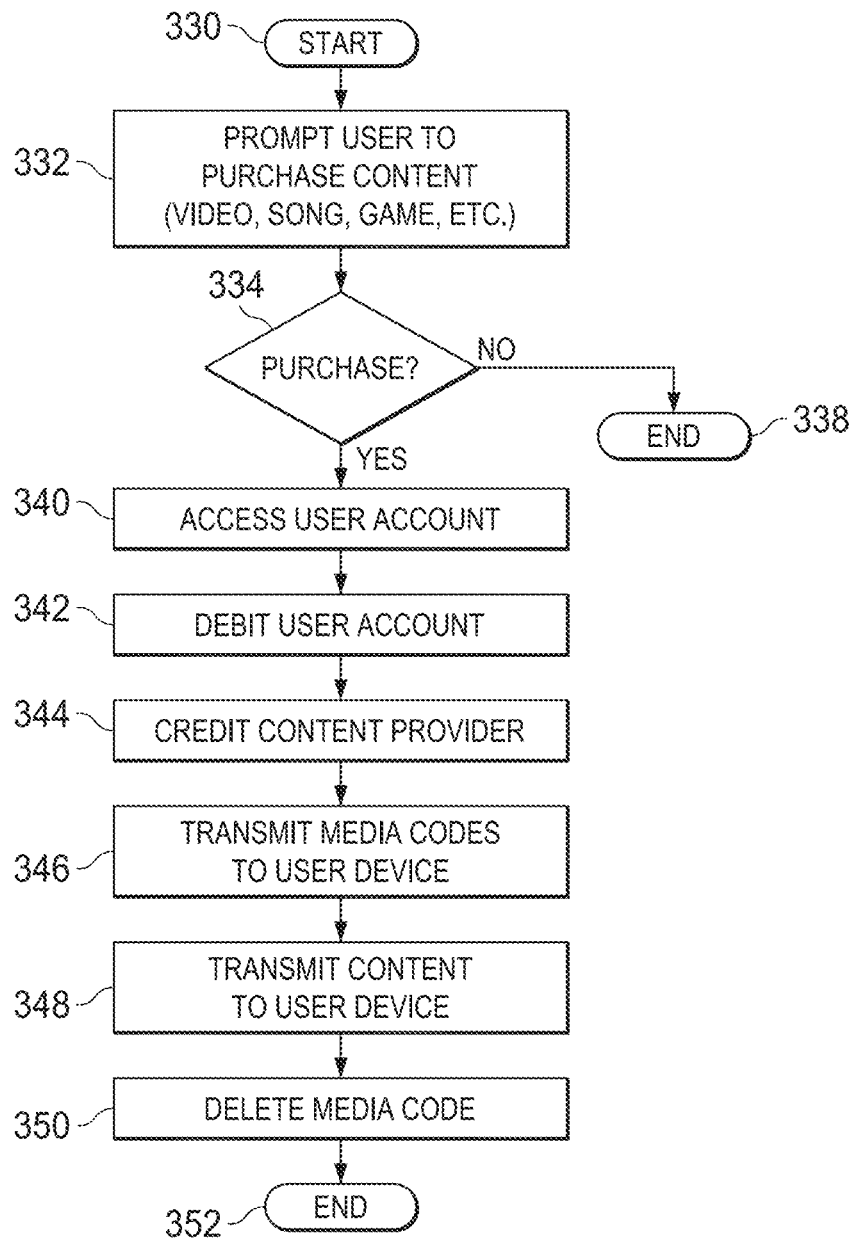
FIG. 3A is a flow chart illustrating an alternate method of providing media content to users having mobile user devices as disclosed herein.

FIG. 3A is a flowchart illustrating an alternate method wherein media content is offered for sale. In this embodiment, only a portion of the selected media content is transmitted and played with user device 200 at step 330 to enable a user to determine whether he or she wishes to purchase the entire selected media content for example, an album of songs, a movie or an electronic game. At step 332, the user may be prompted to purchase the entire media content, this enables a user to determine whether he or she wishes to purchase the entire selected media content for example, an album of songs, a movie or an electronic game. The prompt to purchase the selected media content may also provide the user with an opportunity to view or play different songs, videos, games, etc., giving the user a choice of media content from which he or she may select.

At step 324, the user determines whether he or she wishes to purchase the selected media content. If the user elects not to purchase the media content, the process ends at step 338. If the user decides to purchase the media content, mobile user device 200 transmits a message to server 220 indicating that the media content has been purchased. The user's account is accessed at step 340 and the account is debited for the purchase price of the media content at step 342. If the user does not have an account, the user may establish an account at this point. User profile information stored on server 220 may be accessed to establish an account and/or the user may enter the information required to establish an account for example, user's name, address, birth date and a credit card or debit card number that the content provider may use to charge the purchase price of the media content provided to the user.

Alternatively, the user may enter a debit or credit card number to pay for the selected content without establishing an account with the content provider. At step 344, the media content provider may be credited by the operator of web server 220 a fixed fee or a percentage of the purchase price of the media content purchased by the user. The media code or codes 235 corresponding to the purchased media content are transmitted to mobile user device 200 at step 346, after which the purchased media content may be transmitted to the user at step 348 as described above. Media codes or codes 235 are then deleted from user device 200 at step 350 and the process ends at step 352.

Server 220 and or content server 250 may communicate with one or more sponsor or advertising entities via server 260 (FIG. 2). Referring now to FIGS. 4 and 5, sponsoring entities 260 may provide promotional content 402 that may be presented on display 202 of user device 200 in connection with media content played or displayed on mobile user device 200. Since mobile user device 200 is provided with GPS capability, the location of the device may be transmitted to web server 220, sponsor server 260 and/or content server 250 such that location specific advertising content may be selected for display on the user device. For example, if user device 200 is in a shopping mall, advertising for shops or stores in the mall may be selected for presentation to the user of the device.

Referring specifically to FIG. 5, a database 500 may be utilized to determine specific promotional content to be displayed to a user. Database 500 may include the ID 230 or other code associated with the particular media content, one or more URLs 504 associated with IDs 230 and with different user registrations 502. Database 500 may be resident on sponsor server 260, web server 220 or content provider sever 250. For example, a user may be unregistered, registered as a standard user, registered as a family user or registered as an adult user. Different URLs 504 may be associated with the different categories of users and used to access advertising content determined to be appropriate for the particular category of user. For example, different advertising content may be provided to a user registered as a family user versus a user registered as an adult user. Typically, advertising entities 260 pay content provider 250 a fee for displaying or providing advertising content 402 along with the user's selected media content. In different variations, advertising or sponsoring entities 260 may pay content provider 250 a fee for each time that the advertising content is transmitted to a mobile user device 200.

Figure 6:
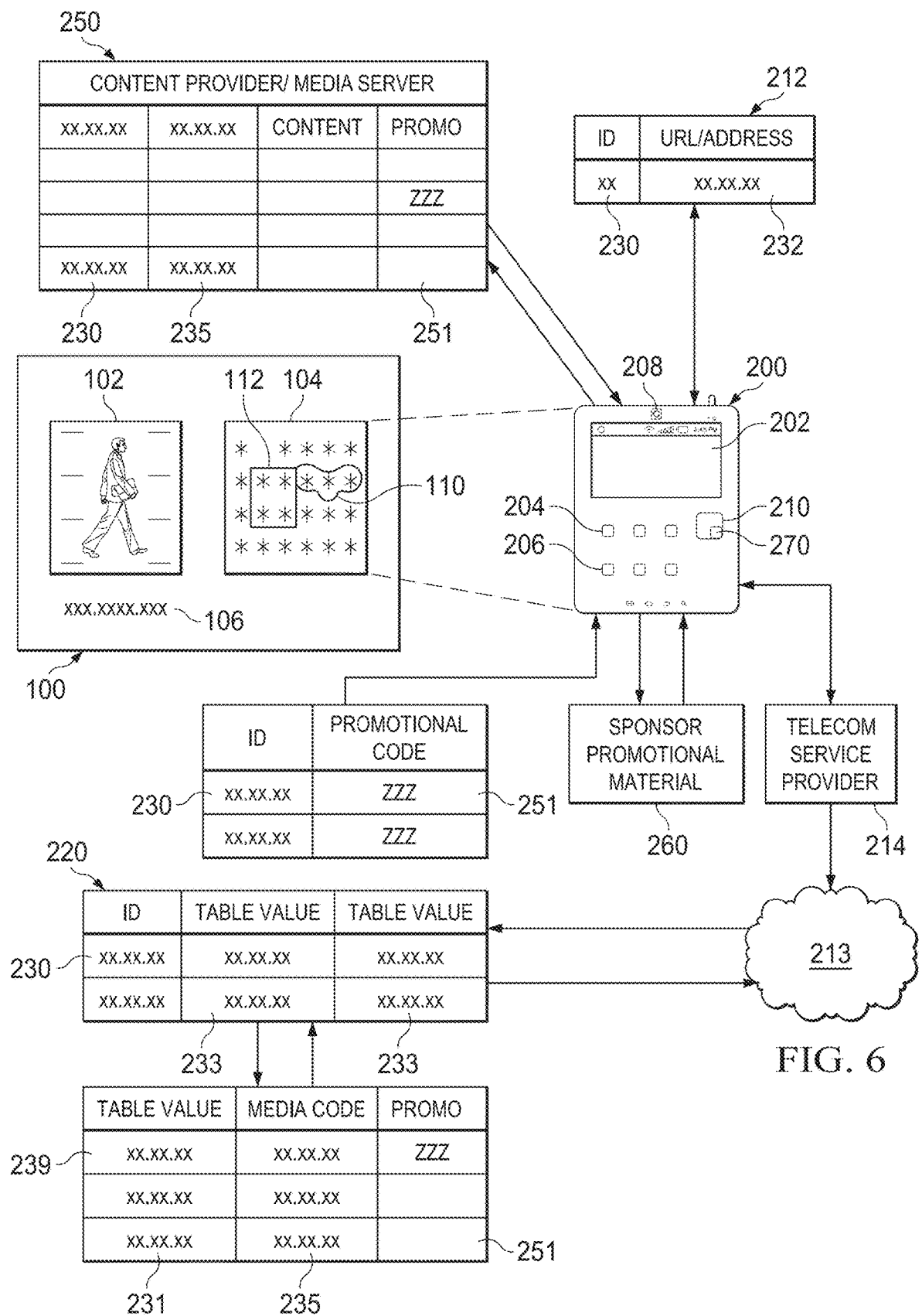
FIG. 6 is a schematic representation of a system and method for providing media content to users according to the disclosure.

Referring now to FIG. 6, a method of providing media content to the user of a mobile device 200 such as a cell phone or PDA is further described. The user of the device scans or photographs a card 100 as previously described. Application software 270 identifies image 110 and portion 112 of code 104. After application software 270 decodes portion 112 of code 104 it transmits ID 230 along with the token associated with the user device to web server 220 where the authenticity of application software 270 is verified using the token and a table value 233 is determined using ID 230. More than one table value or code 233 may be associated with a given ID 230. For example, multiple pieces of media content 241 may be associated with ID 230 or a table value may be used to identify a sponsor or sponsor promotional material to be presented with a particular item of media content. In another variation a table value may be used to identify a particular promotion of a media item.

Table value or values 233 are used in conjunction with database 231 to identify media codes 235 associated with specific media items. Server 239 uses a table value 233 as a pointer for identifying a particular media code 235 associated with a particular media item in database 231. After media code 235 has been identified, it is transmitted back to user device 200. Media code 235 may be transmitted directly to user device 200 from server 239 or may be transmitted through web server 220. In an embodiment where database 231 is resident on web server 220, it is returned directly to user device 200.

In one embodiment, mobile device 200 accesses a database 272 resident on the device as indicated to determine an address or URL 232 of a content server 250 associated with ID 230. In different variations, address 232 of content server 250 may be resident on web server 220, in which case it is transmitted to user device 200 along with media code 235. After identifying the address or URL the content provider 250 associated with ID 230, mobile device 200 transmits a message to content provider 250 including media code 235. The message transmitted to content provider 250 may also include additional information such as the token associated with the user device, codes identifying sponsor promotional material and the location of such materials on server 260 or multiple media codes 235. Mobile device 200 may simultaneously transmit a message to sponsor server 260 identifying the media content to be played or displayed. After identifying the desired media content, content server 250 transmits the identified media content to mobile device 200 for listening and/or viewing. Sponsor promotional material may be simultaneously transmitted to mobile device 200 for display with the selected media content. As previously noted, the media content may be music, video, an electronic game or other content.

In one variation, an artist or media provider may elect to promote their media content with special features, such as a live impromptu performance, video clips, interviews and similar features. In these instances, the artist or performer may produce such a feature and upload the feature to content server 250 with an identifier or promotional code 251. Promotional code 251 may be pushed from content server 250 to web server 220 and associated with ID 230 and associated with a table value for the ID. Web server 220 then push the promotional code along with ID 230 to mobile user device 200 when application software 270 is started or initiated on the mobile device. The ID 230 and promotional code 251 may be stored in a database 280 resident on mobile user device 200. When a card 100 having code 230 associated with a promotional code 251 is scanned, application software 270 displays or otherwise informs the user of mobile user device 200 of the special feature. The user may then be given the option of accessing and playing the special feature.

The foregoing method provides a content provider with a means of promoting and distributing media content. The content is promoted by means of cards 100 (FIG. 1) which may be given or sold to potential consumers. Server 220 and application software 270 enable a consumer to utilize and select from different media content promoted with cards 100 using a mobile communications device. The provider of cards 100 and the operator of server 220 may be compensated for each time a consumer accesses media content available through content provider 250 and/or each time a consumer chooses to purchase and download available media content. Content provider 250 and the server operator may realize additional revenue from sponsors and advertisers by presenting promotional content to a user of mobile user device 200 along with selected media content.

Figure 7:
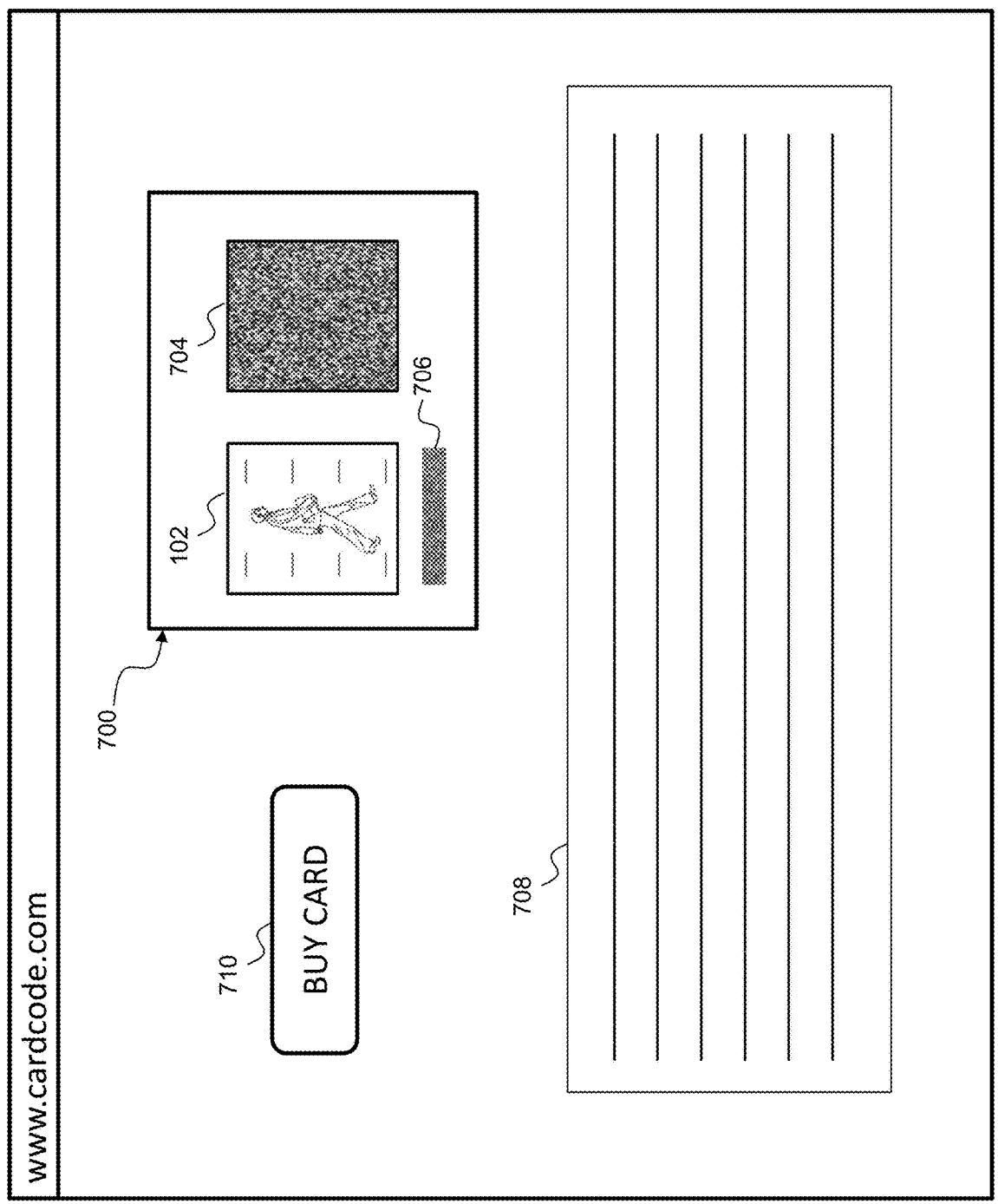
FIG. 7 illustrates one embodiment of an enciphered digital access card displayed on a webpage.

Referring now to FIG. 7, there is illustrated one embodiment of an enciphered digital access card 700 displayed on a webpage 702. As illustrated, each digital access card 700 may include the illustration or photograph 102 of a recording artist or another image associated with the particular media content being promoted. The digital access card 700 also includes enciphered machine readable code 704 associated with the song, video or other piece of media content being promoted. The enciphered machine readable code 704 would appear scrambled to anyone viewing the digital access card 700, in order to prevent someone from scanning the enciphered machine readable code 704 or otherwise using it in any way. The visual effect of scrambling the image may vary, depending on preference. The pixels may be simply rearranged, a blurring effect may be added to the image, or other means of distorting the image may be used. In one embodiment, the enciphered machine readable code 704 may be a barcode, a QR code, an alphanumeric code or similar code. The enciphered machine readable code 704 is associated with the particular media content being promoted with the digital access card 700.

In some embodiments, the digital access card 700 may also include an enciphered URL 706 to enable a user to access a webpage to download application software enabling the user to access the media content being promoted. The enciphered URL 706 may be in the form of a machine readable code such as a barcode or QR code such that the URL may be scanned. The enciphered URL 706 would appear scrambled to anyone viewing the digital access card 700, in order to prevent someone from scanning the enciphered URL 706 or otherwise using it in any way. In some embodiments, a user may be charged a fee in order to view a deciphered version of the digital access card 700, while in other embodiments access may be granted as part of a promotional campaign or similar circumstances.

The webpage 702 may also include, in addition to the digital access card 700, a description 708 of the content to which the digital access card 700 grants access. The description 708 may also contain other information, such as how to scan or otherwise use a card, links to other cards or content, legal information, or other information. The webpage 702 may also include an option 710 to buy the card. Selecting the option 710 would initiate a payment process to allow a user to purchase access to the card. In other embodiments, the option 710 would allow a user to access the card based on a promotional campaign. Once the option 710 is selected, the user may then fulfill the required payment or follow other instructions to gain access to the card.

Figure 8:
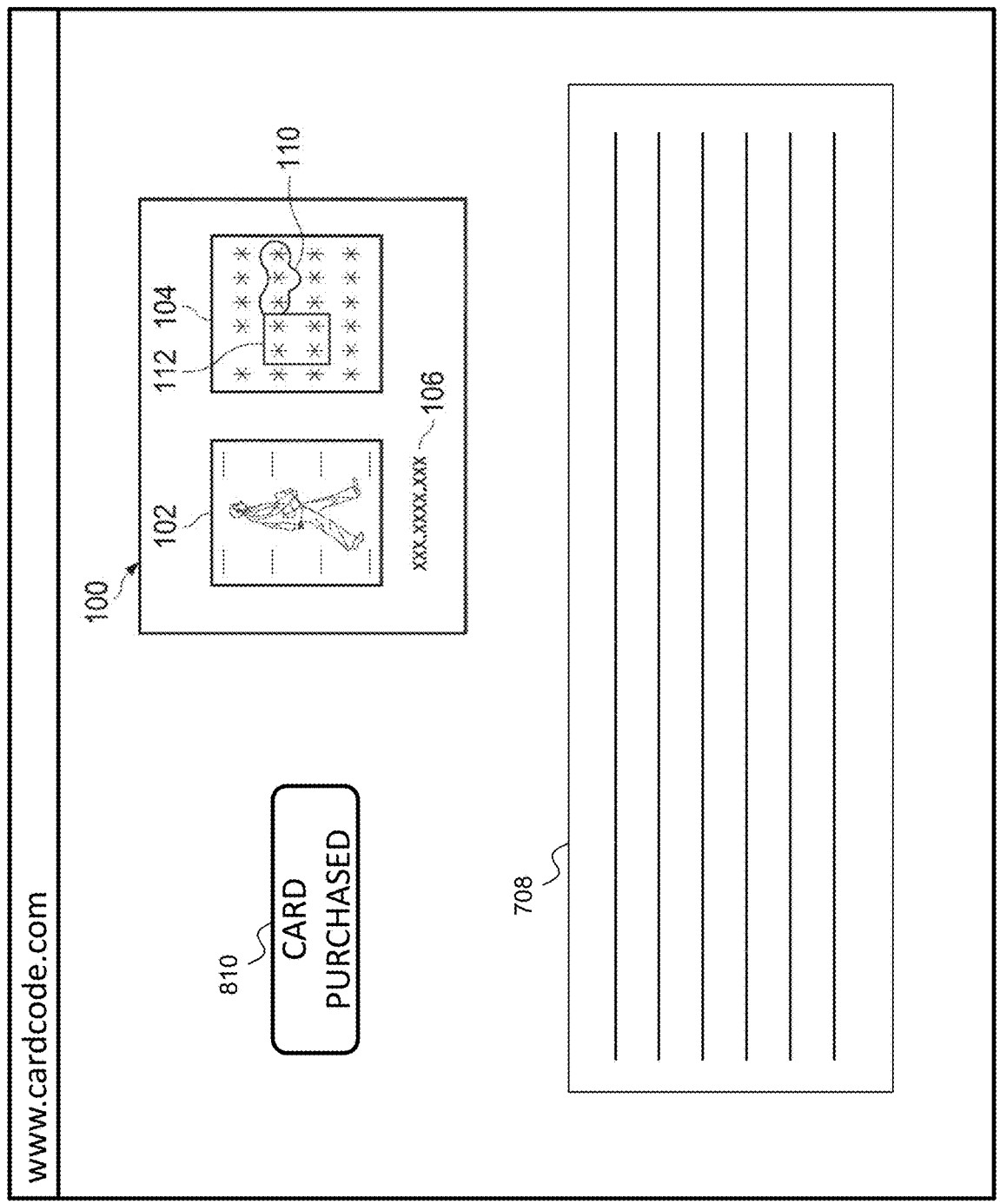
FIG. 8 illustrates one embodiment of a deciphered digital access card displayed on the webpage.

Referring now to FIG. 8, there is illustrated one embodiment of a deciphered digital access card 100 displayed on the webpage 702. The access card 100 would have been deciphered from the enciphered digital access card 700. After a user completed the payment process, they would be directed back to webpage 702, where the user would initially again view the enciphered digital access card 700. An animation would then play to allow the user to see the enciphered digital access card 700 deciphered before their eyes. This animation may rearrange the pixels of the image of the enciphered digital access card 700 to again display the image as access card 100. The animation may play from 10-30 frames per second (FPS) in order to allow the user to see the effect. In other embodiments, the user may simply see the deciphered access card 100 without an animation being played. Additionally, instead of option 710 still being listed, the webpage may update to instead include an indicator 810 that the card has already been purchased by the user.

The machine readable code 104 of card 100, for example, a QR code, may include an image or indicia 110 positioned within or embedded in the code. The image may be used in connection with a program e.g., the application software, which identifies image 110 and/or a portion 112 of the QR code within code 104. As set forth herein, image 110 may serve as a means of further identifying a recording artist, a provider of media content, and/or specific media content that may be accessed using the card. As will be appreciated, image or indicia 110 serves as a pointer or locator for portion 112 of code 104 and may be positioned at different locations on card 100. It will be appreciated that access card 100 may be scanned in the same manner whether it is a physical card or a digital card. If a digital card, the user would simply use their mobile device to scan the image displayed on a screen where the webpage 702 is displayed.

Figure 9:
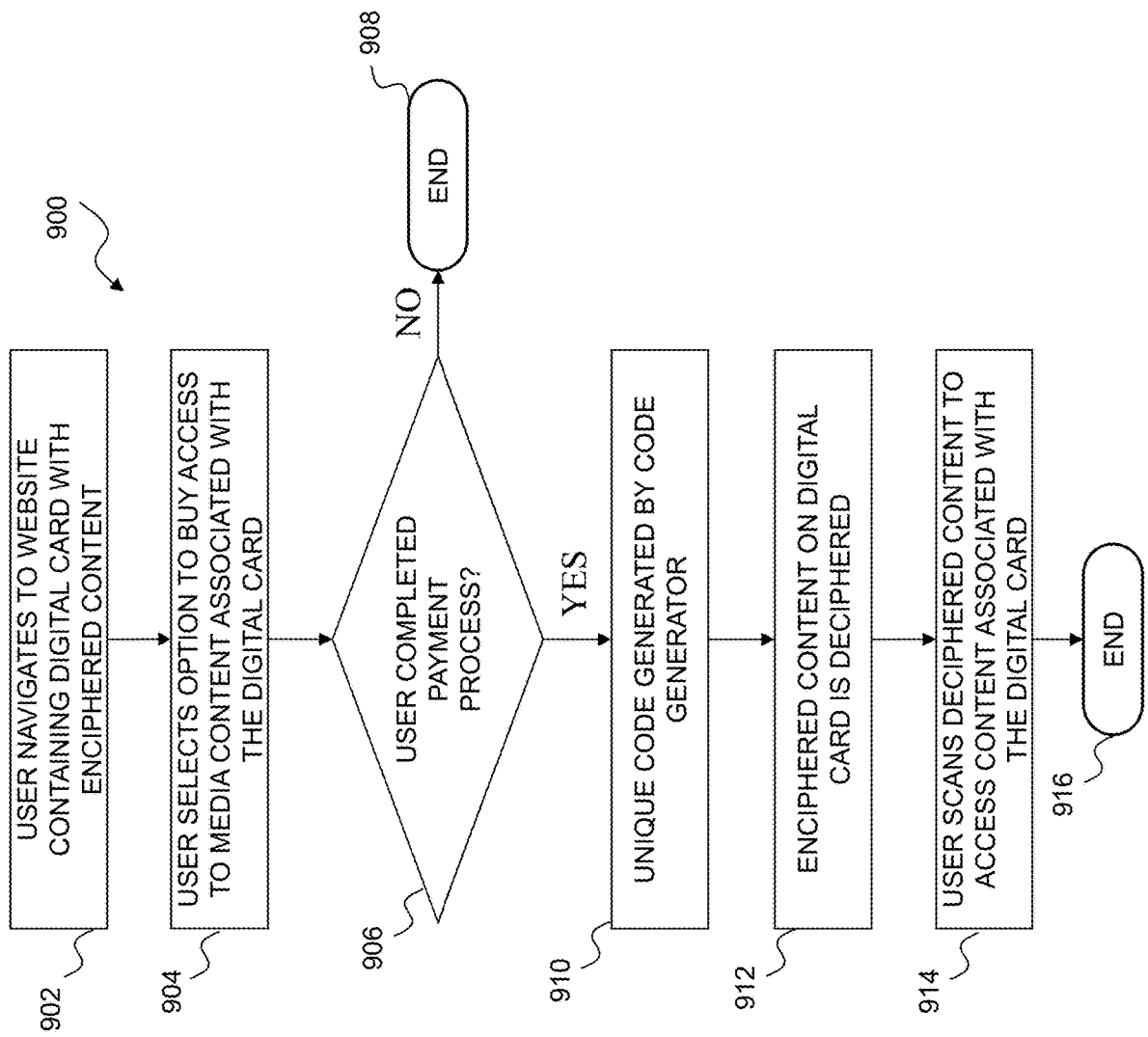
FIG. 9 illustrates a flowchart depicting one embodiment of an enciphered digital access card deciphering process.

Referring now to FIG. 9, there is illustrated a flowchart depicting one embodiment of an enciphered digital access card deciphering process 900. The process 900 begins at step 902 where a user navigates to a website containing the digital access, the digital access card having certain content enciphered or scrambled. At step 904, the user selects an option to buy access to media content associated with the digital access card. At step 906, it is determined whether the user has completed the payment process. If the user did not complete the payment process, the process 900 ends at step 908. If the user did complete the payment process, the process 900 moves to step 910, where a unique code is generated by a code generator. The unique code generated may be a random number or a sequential number, with each number generated being incremented from the previous number generated. The code may also be appended to an identification number associated with the user, in order to provide for a unique code. For example, if the code generator produces a number, the uniqueness of the code would be assured by appending the number to the user's identification number in a UID+CODE format. For instance, if the user ID is 12345 and the generated code is 30002, the unique code may be 1234530002. The unique code is used in a similar manner as the ID 230. In some embodiments, once the card is scanned, the unique code may be removed from the database to disable anyone else from also scanning the same, already-purchased, card.

The process then moves to step 912, where the enciphered content on the digital access card is deciphered. As described herein, after the user completed the payment process, they would be directed back to a webpage where the user would initially again view the enciphered digital access card. An animation would then play to allow the user to see the enciphered digital access card deciphered before their eyes. This animation may rearrange the pixels of the image of the enciphered digital access card to again display the image as access card. The animation may play from 10-30 FPS in order to allow the user to see the effect. In other embodiments, the user may simply see the deciphered access card without an animation being played.

The process 900 then moves to step 914, where the user scans the deciphered content using the user's mobile device, in order to gain access to the content associated with the purchased digital card. It will be understood that this process would be substantially the same if the card was being offered as a promotional item, wherein the user may enter a promotional code or similar action rather than going through a payment process. The process 900 then ends at step 916. After the conclusion of process 900, the user may access the digital media content either through a browser or via an application on the user's mobile device. The digital media content may include music, videos, games, or other content that can be updated and streamed to the user. For instance, an artist may release a new single after the user has already scanned a card associated with the artist. The user's application may then receive an update that includes the new single, without the user needing to make an additional purchase.

Figure 10:
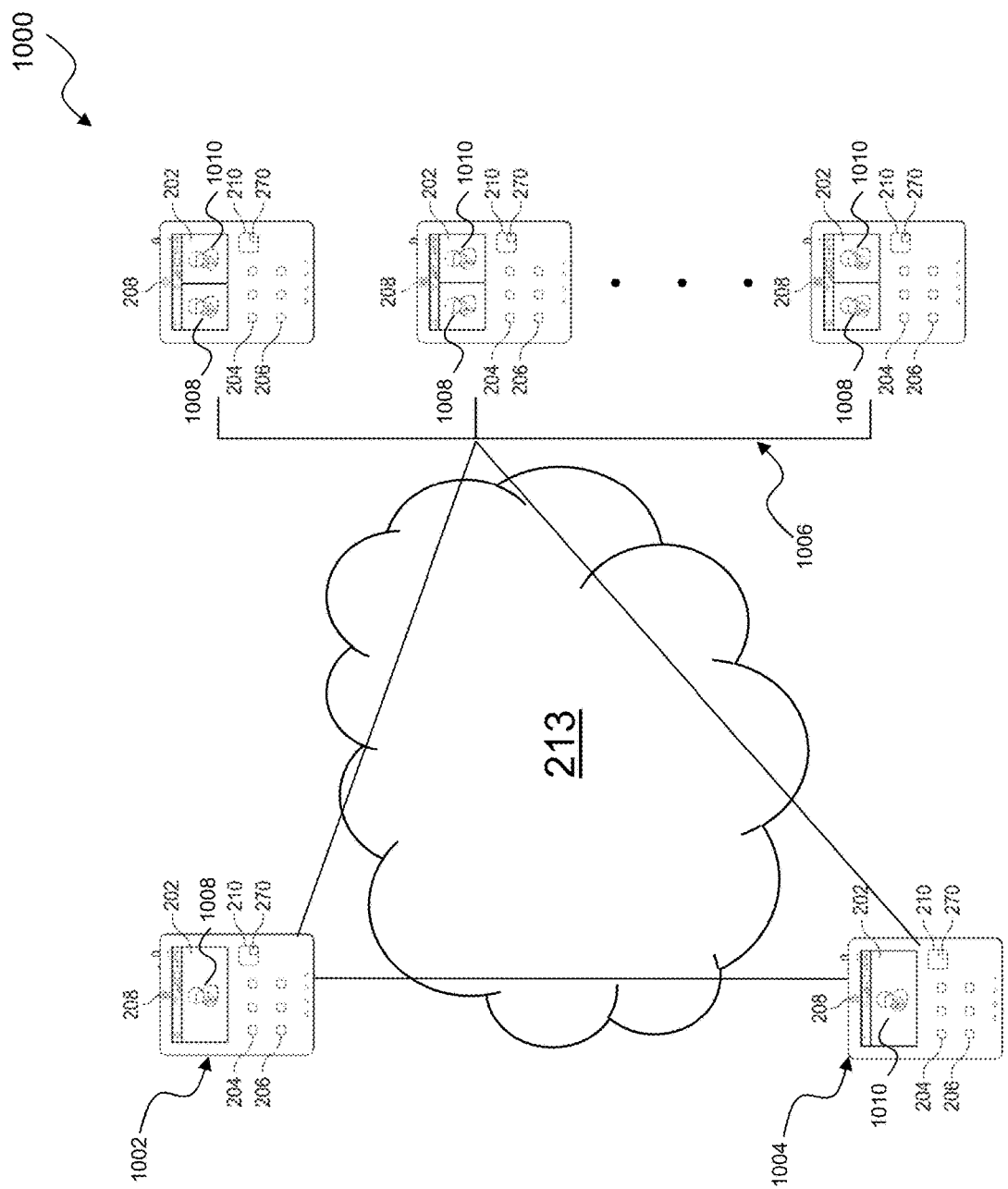
FIG. 10 illustrates one embodiment of a split-screen streaming video system.

Referring now to FIG. 10, there is illustrated one embodiment of a split-screen streaming video system 1000. In some embodiments of the present application, there may be functionality that allows for artists or others involved with the process of creating the digital media content to interact with the user. For example, the application may allow for a music artist to stream a live recording studio session to all users who have purchased access to the digital media content. The music artist may even single out a user to speak to during the session, with the application allowing for the video stream to switch to streaming the user, if desired, or to stream a video of both the user and the artist in a split-screen screen configuration.

The system 1000 includes an artist device 1002, a selected user device 1004, and a plurality of user devices 1006 capable of connecting over a network such as the Internet 213. It will be understood by one skilled in the art that certain structures such as a media server for passing streaming content segments may be disposed on the network to provide a middle-man for connections between the artist device 1002, the selected user device 1004, and the plurality of user devices 1006. When an artist streams a video to user from the artist device 1002 to the plurality of user devices 1006, the plurality of user devices 1006 displays a video or image 1008 of the artist. During a streaming session, the artist may decide to select a user to partner with during the streaming session, in order to single out the user. This may be done as a marketing tactic to treat a user who has paid to access media content, such as paying for a scannable card, and to create goodwill among an artist's fans. The selected user may be selected by looking up users in a database who have purchased access to the artist's content. This may be done randomly as a drawing or the selected user may be selected based on other criteria. Once the artist has selected a user to interact with, the selected user may be given the chance to accept an invitation to join in the video stream with the artist. Once the invitation is accepted, a video stream of the selected user is streamed from the selected user device 1004 to the artist device 1002, while the selected user device 1004 would still display the video or image 1008 of the artist. Thus, the artist device 1002 would display a video or image 1010 of the selected user.

Additionally, a video stream of the selected user would be streamed from the selected user device 1004 to the plurality of user devices 1006. In order to facilitate seeing both the artist stream and the selected user stream, the display 202 of the plurality of user devices 1006 may present both the artist stream and the selected user stream in a split-screen configuration, with the video or image 1010 of the selected user appearing alongside the video or image 1008 of the artist. Such a split-screen configuration could be side-by-side, with the video or image 1008 of the artist appearing to the left or right of the video or image 1010 of the selected user. The split-screen configuration could also be presented with the video or image 1008 of the artist above or below the video or image 1010 of the selected user. It will be understood that other configurations may be used as well. It will also be understood that the selected user device 1004 may also present both videos in a split-screen configuration as well, instead of only the artist's stream. Once the artist decides to end the interaction with the selected user, the plurality of user devices 1006 may revert back to showing only the artist's video stream within a single window.

Figure 11:
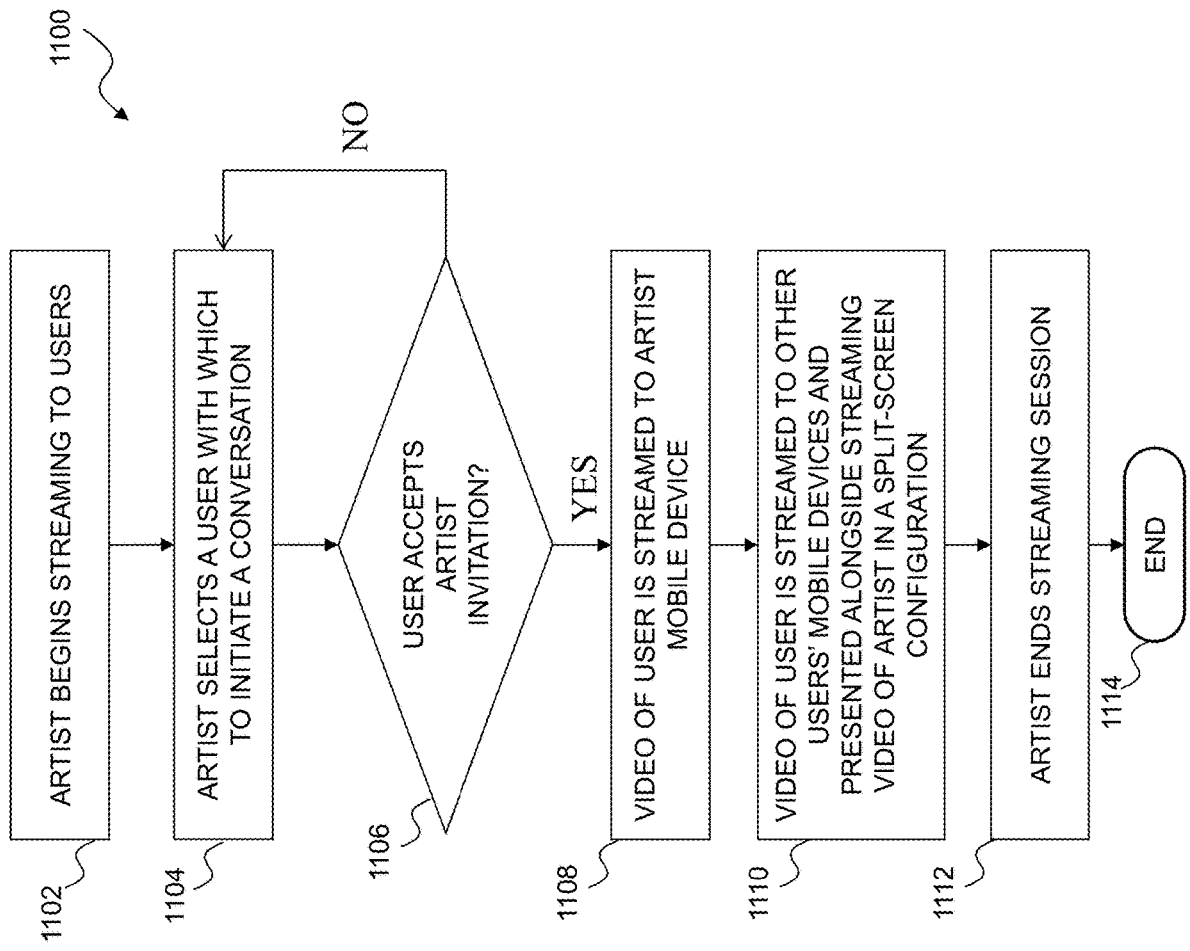
FIG. 11 illustrates a flowchart of one embodiment of a split-screen streaming process.

Referring now to FIG. 11, there is illustrated a flowchart of one embodiment of a split-screen streaming process 1100. The process 1100 beings at step 1102 where an artist begins streaming video to users. Users may be notified that the artist has begun streaming, such as receiving a notification from a proprietary application installed on the users' mobile devices, via email, via text message, or other means of notification. Users may then launch an application or navigate to a webpage to view the video stream. The video stream may only be accessible by those users who have purchased access to the artist's content. At step 1104, the artist selects a user watching the video stream to initiate a conversation with that user. At step 1106, it is determined whether the user accepts the invitation to participate in the conversation. If the user does not accept, the process moves back to step 1104 where the artist can select another user to initiate a conversation with.

If the user accepts the invitation, the process moves to step 1108, where a video stream of the invited user is streamed to the artist's mobile device. At step, 1110, the video stream of the user is also streamed to the other users watching the live stream, with both the stream of the artist and the stream of the invited user being presented simultaneously in a split-screen configuration, as described above with respect to FIG. 10. At this stage in the process 1100, the invited user and the artist can communicate with one another, while the other users can view the exchange. At step 1112 the artist terminates the streaming session, resulting in the end of the process 1100 at step 1114.

It will be appreciated by those skilled in the art having the benefit of this disclosure that the method and system disclosed herein provides a means of delivering music and other media content to a smart phone or similar mobile user device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof.

It will be appreciated by those skilled in the art having the benefit of this disclosure that this method for delivering music content to a smart phone provides a method of delivering music content to a smart phone provides a convenient means for users to access media content as well as providing the artists and producers a means of distributing such media content. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of distributing media content using mobile communication devices, comprising:

providing digital media access cards, the digital media access cards promoting selected media content and containing enciphered information;

allowing a user of a mobile communication device to be granted access to a digital media access card;

generating an identification number, the identification number associated with the selected media content;

deciphering the enciphered information to create deciphered information, the deciphered information allowing the user to access a web server associated with the digital media access cards with the user's mobile communication device and download application software enabling the user to access the selected media content with the user's mobile communication device, the deciphered information further including machine-readable code corresponding to the identification number, whereby the application software facilitates reading the machine readable code with the mobile communication device and transmitting the code to the web server with the mobile communication device;

receiving the identification number with the web server and using the identification number to locate a table value in a database wherein identification numbers from a plurality of media access cards are each associated with a table value corresponding to media content associated with the access cards; and using the table value to identify a media code associated with the selected media content in a content server whereupon the media code is transmitted to the mobile communications device whereby the mobile communication device may transmit the media code to the content server, the content server transmitting the selected media content to the mobile communication device upon receiving the media code from the mobile communication device, wherein the machine readable code corresponding to the identification number is embedded in a larger field of machine readable code, the card including an indicia recognizable by the application software, the indicia indicating the location of the machine readable code corresponding to the identification code within the larger field of machine readable code.

2. The method of claim 1, wherein the media access cards incorporate a web address for the website.

3. The method of claim 1, wherein sponsor promotional material is transmitted to the mobile communication device simultaneously with the selected media content.

4. The method of claim 3, wherein the sponsor promotional material is resident on a sponsor server and wherein one of the table value or media code is used to identify sponsor promotional material to be transmitted to the mobile communication device with the selected media content.

5. The method of claim 1, wherein the selected media content includes streaming video content.

6. The method of claim 5, further comprising the steps of:
transmitting a first video stream to a plurality of users of mobile communication devices;
selecting one of the plurality of users to invite the one of the plurality of users to participate in the video stream; and
transmitting a second video stream, the second video stream being of the one of the plurality of users, to the plurality of users other than the one of the plurality of users.

7. The method of claim 6, wherein the first video stream and the second video stream are presented in a split-screen configuration on a display of the mobile communication devices of the plurality of users.

8. A method of distributing media content using mobile communication devices, comprising:
providing enciphered information;
generating an identification number, the identification number associated with selected media content;
deciphering the enciphered information to create deciphered information, the deciphered information allowing a user of a mobile communication device to access a web server with the user's mobile communication device and download application software enabling the user to access the selected media content with the user's mobile communication device, the deciphered information further including machine-readable code corresponding to the identification number, whereby the application software facilitates reading the machine readable code with the mobile communication device and transmitting the code to the web server with the mobile communication device;

receiving the identification number with the web server and using the identification number to locate a table value in a database having identification numbers each associated with a table value corresponding to media content; and using the table value to identify a media code associated with the selected media content in a content server whereupon the media code is transmitted to the mobile communications device whereby the mobile communication device may transmit the media code to the content server, the content server transmitting the selected media content to the mobile communication device upon receiving the media code from the mobile communication device, wherein the machine readable code corresponding to the identification number is embedded in a larger field of machine readable code, and further providing an indicia recognizable by the application software, the indicia indicating the location of the machine readable code corresponding to the identification code within the larger field of machine readable code.

9. The method of claim 8, wherein sponsor promotional material is transmitted to the mobile communication device simultaneously with the selected media content.

10. The method of claim 9, wherein the sponsor promotional material is resident on a sponsor server and wherein one of the table value or media code is used to identify sponsor promotional material to be transmitted to the mobile communication device with the selected media content.

11. The method of claim 8, wherein the selected media content includes streaming video content.

12. The method of claim 11, further comprising the steps of:
transmitting a first video stream to a plurality of users of mobile communication devices;
selecting one of the plurality of users to invite the one of the plurality of users to participate in the video stream; and
transmitting a second video stream, the second video stream being of the one of the plurality of users, to the plurality of users other than the one of the plurality of users.

13. The method of claim 12, wherein the first video stream and the second video stream are presented in a split-screen configuration on a display of the mobile communication devices of the plurality of users.

\* \* \* \* \*